(No Model.)

T. FARWICK.
POSTAGE STAMP AND ENVELOP MOISTENER.

No. 583,701. Patented June 1, 1897.

WITNESSES

INVENTOR
Theodore Farwick
BY
ATTORNEYS

UNITED STATES PATENT OFFICE.

THEODORE FARWICK, OF ELIZABETH, NEW JERSEY.

POSTAGE-STAMP AND ENVELOP MOISTENER.

SPECIFICATION forming part of Letters Patent No. 583,701, dated June 1, 1897.

Application filed March 18, 1897. Serial No. 628,161. (No model.)

*To all whom it may concern:*

Be it known that I, THEODORE FARWICK, a citizen of the United States, residing at Elizabeth, county of Union, and State of New Jersey, have invented certain new and useful Improvements in Postage-Stamp and Envelop Moisteners, of which the following is a specification.

My invention relates to an envelop and postage-stamp moistener, and has for its object the production of a simple and effective device for moistening postage-stamps and envelops.

My invention consists of an envelop and stamp moistener comprising a reservoir, a holder integral with said reservoir and communicating therewith by suitable perforations, and an absorbent filling secured in said holder.

Figure 1:
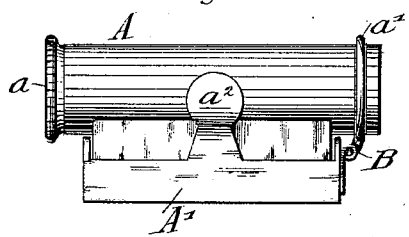
Figure 2:
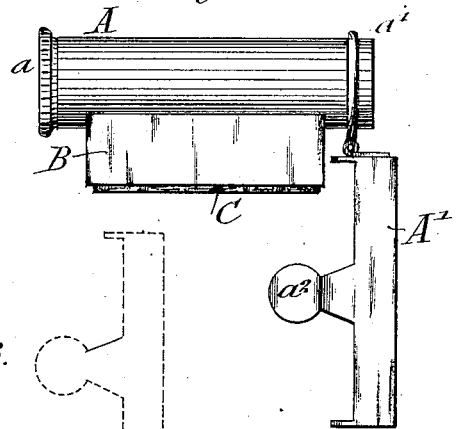
Figure 3:
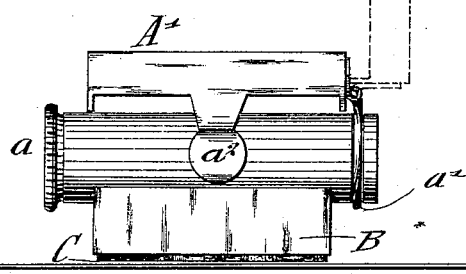
Figure 4:
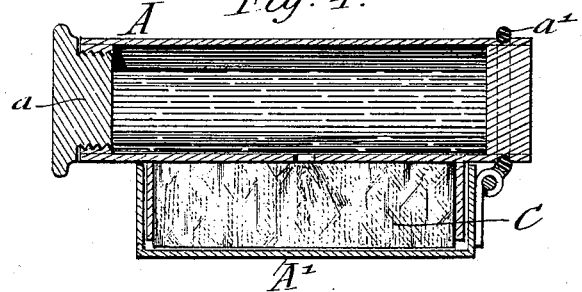
Figure 5:
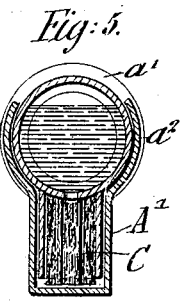
Figure 6:
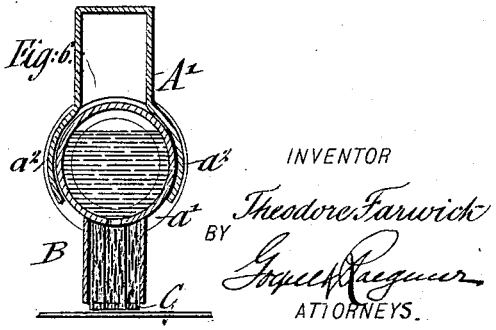

In the accompanying drawings, Figure 1 is an elevation of the device closed. Fig. 2 is a similar view of the device open. Fig. 3 is an elevation of the device with the cover swung around and secured on top. Fig. 4 is a longitudinal central section. Fig. 5 is a central transverse section with the cover shut. Fig. 6 is a central transverse section with the cover open and secured on top of the device.

Similar letters of reference indicate corresponding parts.

Referring to the drawings, A is a cylindrical reservoir closed at one end and threaded at the opposite end for the reception of a threaded plug or stopper *a*. Projecting from one side of the reservoir A is an oblong holder B, which extends nearly the whole length of the reservoir. The holder B and the case A communicate by means of one or more small perforations or their equivalent. The oblong holder B is adapted to receive a filling C, which may be composed of any absorbent material—such as wool, sponge, or the like—and which tightly fills the interior of the oblong holder B and projects slightly beyond the edges of said holder.

The closed end of the reservoir A is grooved circumferentially to receive a wire loop $a'$, which is loosely fitted therein, so as to turn freely about said reservoir. The cover A' is hinged to said wire loop and is composed of a hollow metal cap substantially the size and shape of the holder B and adapted to be closed down over the same and inclose the filling C. At suitable points on said cover A' are secured spring-arms $a^2$, one on each side thereof, whereby the said cover may be securely held in position when closed upon the holder B or when swung around upon the top of the reservoir, as shown in Fig. 3. After the absorbent material is firmly packed in the holder B the stopper *a* is removed and the reservoir filled with water and the stopper again applied. The water passes through the perforations communicating with the holder and is absorbed by the material of the filling C. When it is desired to moisten an envelop or stamp, the cover A' is pulled off the holder and turned around and secured by means of its spring-arms upon the top of the reservoir A. The cover in this position forms a convenient handle by which to grasp the device. The absorbent filling which projects, as above stated, slightly beyond the edges of the holder is passed over the surface of the envelop or stamp and leaves sufficient moisture thereon to permit of their intended use. The cover is then released from the top of the reservoir and swung around and closed down on the holder C, thus preventing the evaporation of the water from the reservoir and the drying of the absorbent filling.

Having thus described my invention, I claim as new and desire to secure by Letters Patent—

1. In a device for moistening stamps or envelops, the combination of a reservoir closed at one end and adapted to receive a stopper at the opposite end, a holder integral with said reservoir and communicating therewith by suitable perforations, an absorbent filling secured in said holder, and a suitable cover hinged to a swiveled connection on said reservoir, substantially as set forth.

2. In a device for moistening stamps and envelops, the combination of a reservoir closed at one end and adapted to receive a stopper at the opposite end, a holder integral with said reservoir and communicating therewith by suitable perforations, an absorbent filling secured in said holder, and a hinged cover swiveled to said reservoir and provided with spring-arms, whereby said cover is adapted to be secured over the holder or over the reservoir, substantially as set forth.

In testimony that I claim the foregoing as my invention I have signed my name in presence of two subscribing witnesses.

THEODORE FARWICK.

Witnesses:
PAUL GOEPEL,
GEO. W. JAEKEL.